March 14, 1950      W. B. M. CLARK      2,500,628
ELECTRICAL RATIO INDICATING INSTRUMENT
Filed July 17, 1945
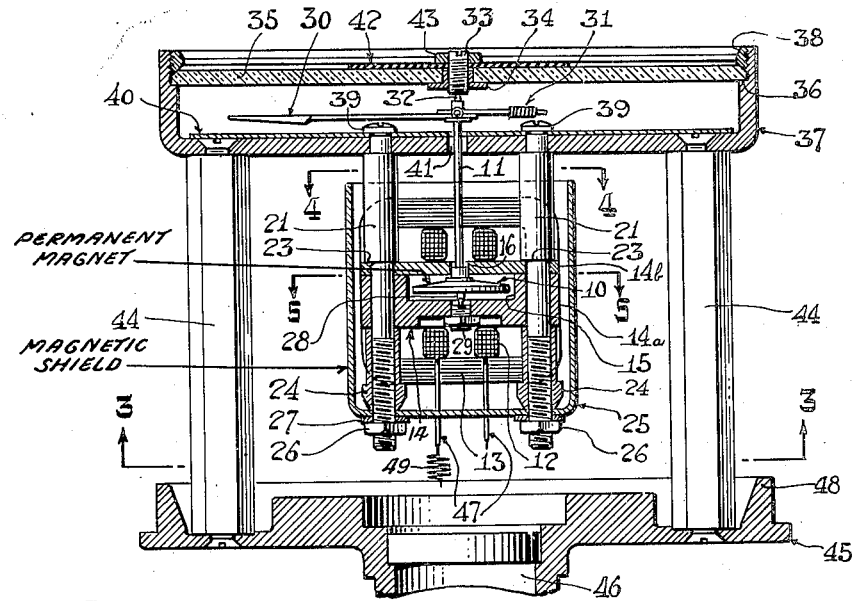
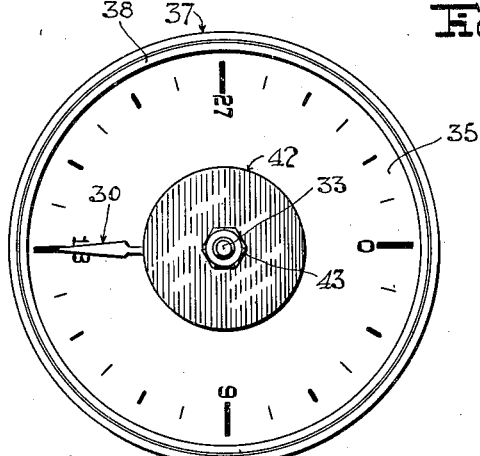
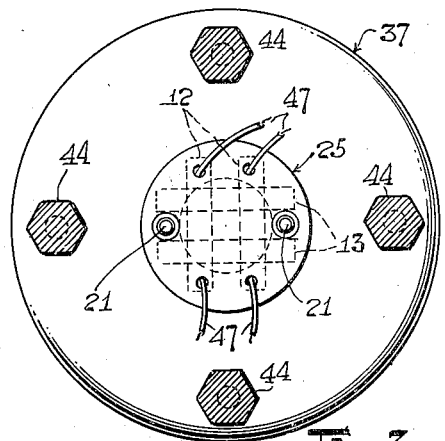
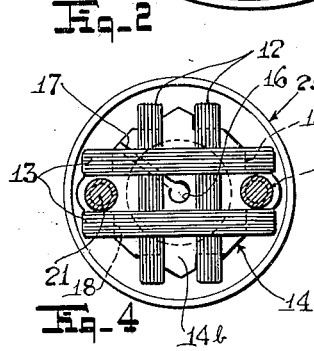
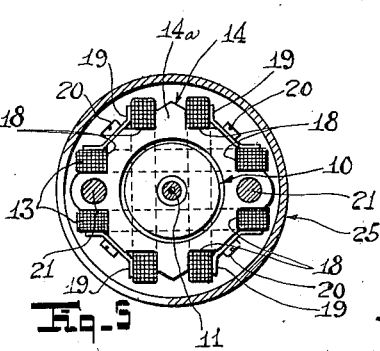
INVENTOR
Winslow B. M. Clark
BY Henry Lanahan
ATTORNEY Patented Mar. 14, 1950

2,500,628

UNITED STATES PATENT OFFICE 2,500,628

ELECTRICAL RATIO INDICATING INSTRUMENT

Winslow B. M. Clark, West Orange, N. J., assignor to Thomas A. Edison, Incorporated, West Orange, N. J., a corporation of New Jersey Application July 17, 1945, Serial No. 605,553

3 Claims. (Cl. 171—95)

This invention relates to electrical indicating instruments of the moving-magnet type and particularly to a novel ratiometer having especial utility as a telemetric receiver.

It is an object of my invention to provide a ratiometer which indicates angles whose tangents are equal algebraically to the ratio of two applied voltages.

Another object is to provide such a meter which has a substantially linear response throughout a 360° scale.

Another object is to provide such a ratiometer which indicates relative to an evenly-distributed scale with negligible error.

Another object is to provide a coil and magnet arrangement having an essentially sinusoidal "torque-deflection" characteristic.

A further object is to provide a simple ratiometer which does not require rigid manufacturing tolerances.

Other objects and features of my invention will more fully appear from the following description and the appended claims.

In the description of my invention reference is had to the accompanying drawing, of which:

Figure 1 is a principally axially sectional view of a ratiometer according to my invention;

Figure 2 is a dial-end view of this ratiometer;

Figure 3 is a section on the line 3—3 of Figure 1;

Figure 4 is a section on the line 4—4 of Figure 1; and

Figure 5 is a section on the line 5—5 of Figure 1.

The operation of the present ratiometer may be described as one fulfilling the relationship:

$$\phi = \tan^{-1} \frac{V_b}{V_a} \quad (1)$$

where $\phi$ is the angle indicated—the angle of deflection from a zero position—and $V_b$ and $V_a$ are the applied voltages. It will be understood that if in this relationship $V_b$ and $V_a$ are varied sinusoidally as a function of an angle $\theta$, say $V_b = V \sin \theta$ and $V_a = V \cos \theta$ where $V$ is some constant, then $\phi = \theta$ and the ratiometer indicates directly the angle $\theta$ throughout a 360° scale length. Meters of this character have great utility as telemetric receivers for indicating directions and other quantities which may be represented in terms of trigonometric functions.

The shape of the torque-deflection curves—hereinafter referred to simply as the torque curves—which the ratiometer must have to satisfy Equation 1 can be shown algebraically to be sinusoidal, it being understood that each "torque curve" is a plot of the restoring torque exerted on the rotor, for a given fixed value of current in one of the ratiometer coils or set of coils, as the rotor is moved from an equilibrium position relative to that coil. It is for instance well known that in each indicating positon of a ratiometer there are two opposing torques acting on the rotor which are in equilibrium. The respective torque curves for the meter may be written in generalized form as follows:

$$t_b = V_b f_b(\phi)$$
$$t_a = V_a f_a(\phi) \quad (2)$$

By Equation 1 the ratio of these torques is $$\frac{t_b}{t_a} = \tan \phi \frac{f_b(\phi)}{f_a(\phi)} \quad (3)$$

Since at equilibrium $t_b = -t_a$ it follows that Equation 3 is satisfied when $$f_b(\phi) = K_1 \cos \phi$$
$$f_a(\phi) = -K_1 \sin \phi \quad (4)$$

where $K_1$ is a constant. Therefore the torque curves are $$t_b = T_b \cos \phi$$
$$t_a = T_a \sin \phi \quad (5)$$

where $T_b = V_b K_1$ and $T_a = V_a K_1$. In other words, Equations 5 indicate that two sinusoidal torque curves are required which are displaced in phase by 90°.

I have devised a simple ratiometer of the moving-magnet type having torque curves as indicated by Equations 5. This meter comprises a permanent magnet 10, preferably of one of the highly efficient "Alnico" magnet materials, say "Alnico V" of the Indiana Steel Products Co., which is mounted on a shaft 11. Surrounding the magnet are pairs of crossed field coils 12 and 13 at right angles to one another, the two coils of each pair, or each coil set as these pairs are otherwise herein referred to, being adjacent to the shaft 11 at opposite sides thereof. The detailed mechanical construction of the meter may be similar to that of the ratiometer described and claimed in the Kelly Patent No. 2,362,562, issued November 14, 1944, and having a common assignee with the present application. Accordingly, the magnet 10 is disposed in a damping housing 14 made of conductive material such as copper, which comprises a main section 14a and a cover 14b. The main section has a central well 15 in which is pivotally carried the magnet 10, and the cover has a central opening 16 through which extends the shaft 11, there being also a slot 17 in the cover leading from the opening 16 through the periphery thereof which is to permit the shaft to be inserted into the opening 16 in the assembling of the instrument. The housing 14 has eight peripheral notches 18 for locating the respective coils 12 and 13. Between the adjacent legs of the coils of different sets there are clamps 19, held to the housing by screws 20, which hold the coils seated firmly in the respective notches 18.

The damping housing is carried by two stud bolts 21 which pass through the housing near the periphery thereof at points between the coils of one set. These bolts have shoulders 23 which seat on the cover 14b. Threaded on the lower portion of the bolts are long spacer nuts 24 which serve to clamp the housing sections together. The lower end portions of the bolts extend through apertures in the bottom of a cup-shaped shield 25 and are secured thereto by nuts 26 and lock washers 27. The shield surrounds the magnet and coil arrangement and is held centered relative to the pivot axis of the magnet. Preferably, the shield is made of a high-permeable low-hysteresis material such as Mumetal.

The shaft 11 has a bottom pivot 28 which engages a jewel screw 29 that is threaded into the bottom wall of the main section of the damping housing. At the top of the shaft there is secured a pointer 30 and the usual tailpiece and cross-arms for carrying balancing weights, these arms and weights being generally referred to as 31. The upper end of the shaft has a pivot 32 which engages a top jewel screw 33. This jewel screw is threaded in a bushing 34 which is mounted in a disk 35 of a transparent rigid material such as glass.

The disk 35 is seated onto an interior shoulder 36 of a shallow cup 37 and is held there firmly in place by an annular ring 38 that is threaded into the cup. The meter movement above described is held suspended from the bottom of this cup by screws 39 which thread into the stud bolts 21. These screws 39 also retain a circular dial 40 in the cup against the bottom wall thereof. This dial has a 360° scale graduated in equal angular divisions as indicated in Figure 2. The shaft 11 extends through an opening 41 in the bottom of the cup 37 and dial 40, and the pointer 30 lies within the cup above this dial and below the disk 35. The disk 35 may serve accordingly not only as a support for the top jewel but also as a "glass" for the instrument. To conceal the central portion of the dial, the balancing weights, etc., there is a circular mask 42 mounted on the disk 35 which is retained in place by a lock nut 43 for the jewel screw 33.

The cup 37 is mounted on four posts 44 and these posts are in turn mounted on a circular base 45. The base has a central opening 46 through which lead connections 47 to the instrument are made and has a rim flange 48 for locating thereon an outer case not shown.

I find by my invention that in order to obtain a torque curve which is essentially sinusoidal in shape from a relatively pivoted magnet and field coil it is important that the opposite legs of the coil, which are between the magnet and the shield, lie substantially diametrically opposite the pivot axis of the magnet. Of course, were a single such coil used it could not be flat since its cross legs would have to be bowed to clear the shaft 11. However, single such coils are approximated closely by the coil sets 12 and 13 since the coils of each set are made identical and are positioned closely adjacent to one another at the opposite sides of the shaft 11 so that adjacent legs of the coils of each set will act effectively as one. The coil sets have their effective magnetic axes radial to the pivot axis and are displaced angularly by 90° as abovementioned. With these coils I find it important to use a circular magnet 10 which is magnetized on a diameter line in a uniform magnetic field. The magnet is preferably made thin—i. e., disk-shaped—and beveled so as to have a slightly conical shape. The magnet may for instance be magnetized between two planar pole faces. Since the coil sets are displaced by 90° about the pivot axis of the magnet and the torque curves between the magnet and respective coil sets are each essentially sinusoidal, it will be understood that the two torque curves are related to one another as sine and cosine functions.

It will be noted that when the coil sets are crossed the coils of one set must necessarily have a shorter height (along the pivot axis of the meter) than have the coils of the other set. I find that the shape of the torque curves is determined essentially by the positioning of the leg portions of the coils which lie between the magnet and the shield, and that it is not affected appreciably by variation in the height of the coils. The inner coil set will however be more closely magnetically coupled with the magnet than the outer coil set and will for the same turns as the outer coil set have a somewhat higher peak value of torque per unit of current; also, for the same size of wire the inner coil set will have less resistance. In the present 360° indicator it is essential not only that the torque curves from the respective coil sets shall be sinusoidal but that the coil sets shall be balanced to have torque curves of equal magnitude for equal applied voltages. I may so balance the coil sets by proper selection of their turns and wire sizes, but preferably I provide the coil sets with equal turns of the same-sized wire and balance their effects by adding a resistor 49 in series with the inner coils. Moreover, it may be noted that by adding resistances both in series and parallel with the inner coil set, not only will the two coil sets have equal torque curves for equal applied voltages but also the coil circuits will have equal resistances.

By way of typical example, the following approximate dimensions have been satisfactorily employed in the present ratiometer, using a magnet of "Alnico V": diameter of magnet $\frac{15}{32}''$, thickness of magnet at center $.050''$, bevel of magnet top face 11°; spacing of each coil from pivot axis $\frac{1}{16}''$, width of coils $\frac{1}{8}''$, dimension of coil legs in directions radial of pivot axis $\frac{5}{32}''$, and internal diameter of shield $\frac{21}{32}''$.

Since the coil sets 12 and 13 may be replaced by single coils having legs diametrically opposite the pivot axis of the magnet 10, as above described, it is intended that the term "coil set" in the claims shall be construed broadly to cover a single equivalent coil unless precluded by specified limitations in the claims.

I have herein shown and described a preferred embodiment of my invention, but this embodiment will be understood to be illustrative and not limitative of my invention as the same is subject to changes and modifications without departure from the scope of my invention, which I endeavor to express according to the following claims. While I have in the specification and claims set forth different elements of my invention in terms of specified geometrical relationships, it will be understood that these relationships need not necessarily be rigidly adhered to as some departure therefrom is permissible within the spirit of my invention.

I claim:

1. In an electrical indicating instrument: the combination of a permanent magnet pivoted at its center and magnetized in a uniform magnetic field crosswise to its pivot axis, a field coil set having its magnetic axis radial to said pivot axis and having two legs diametrically opposite said pivot axis and confronting said magnet, said magnet being disk-shaped and the overall width of each of said legs being less than the diameter of said magnet whereby the torque-deflection characteristic between said magnet and said coil set, for a given fixed current in the coil set, is substantially sinusoidally shaped.

2. An electrical instrument for indicating angles whose tangents are equal to the ratio of two applied voltages, comprising a permanent magnet pivoted at its center and magnetized crosswise to its pivot axis, a pair of field coil sets having their magnetic axes radial to said pivot axis and at right angles to each other, each of said coil sets having effectively only two legs confronting said magnet and disposed diametrically opposite each other with respect to said pivot axis, said magnet being disk-shaped and magnetized within a uniform magnetic field, and each of said legs having an overall width less than the diameter of said magnet adapted to cause the torque-deflection characteristic between said magnet and each of said coil sets, for a given fixed current in the coil set, to be substantially sinusoidal through a 350° rotation of the magnet.

3. The instrument set forth in claim 2 wherein one of said coil sets extends through the other and has a lesser resistance than the other, comprising field circuits for said coil sets respectively and a resistance in one of said field circuits adapted to cause said torque-deflection characteristics to be equal for equal voltages applied to said circuits.

WINSLOW B. M. CLARK.

REFERENCES CITED

The following references are of record in the file of this patent:

UNITED STATES PATENTS

| Number | Name | Date |
|---|---|---|
| 1,452,590 | Brogger | Apr. 24, 1923 |
| 1,712,560 | Huggins | Mar. 14, 1929 |
| 2,057,845 | Pattee | Oct. 20, 1936 |
| 2,178,108 | Schwarze | Oct. 31, 1939 |
| 2,354,555 | Sias | July 25, 1944 |
| 2,354,618 | Sias | July 25, 1944 |
| 2,362,562 | Kelly (I) | Nov. 14, 1944 |
| 2,372,002 | Kelly (II) | Mar. 20, 1945 |
| 2,380,242 | Jewell | July 10, 1945 |

FOREIGN PATENTS

| Number | Country | Date |
|---|---|---|
| 8,784 | Great Britain | May 23, 1891 |
| 525,092 | Great Britain | Aug. 21, 1940 |

Certificate of Correction

Patent No. 2,500,628 March 14, 1950

WINSLOW B. M. CLARK

It is hereby certified that error appears in the printed specification of the above numbered patent requiring correction as follows:

Column 6, line 2, for "350°" read *360°*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*